United States Patent [19]

Ando

[11] Patent Number: 4,847,907

[45] Date of Patent: Jul. 11, 1989

[54] SPEAKER SYSTEM FOR RADIATING ACOUSTIC ENERGY INTO A CABIN OF A MOTOR VEHICLE

[75] Inventor: Tomiaki Ando, Tendo, Japan

[73] Assignee: Pioneer Electronic Corporation, Tokyo, Japan

[21] Appl. No.: 175,789

[22] Filed: Mar. 31, 1988

[30] Foreign Application Priority Data

Apr. 3, 1987 [JP] Japan .......................... 62-50773[U]

[51] Int. Cl.$^4$ .......................... H04B 1/00; H04R 1/02

[52] U.S. Cl. .......................... 381/86; 381/87; 381/188; 381/205

[58] Field of Search .................... 381/205, 188, 87, 86

[56] References Cited

U.S. PATENT DOCUMENTS

| | | | |
|---|---|---|---|
| 1,972,927 | 9/1934 | Engholm | 381/188 |
| 3,925,627 | 12/1975 | Ashworth | 381/205 |
| 4,492,826 | 1/1985 | Chiu | 381/87 |

FOREIGN PATENT DOCUMENTS

| | | | |
|---|---|---|---|
| 0271976 | 6/1927 | United Kingdom | 381/188 |

*Primary Examiner*—Jin F. Ng
*Assistant Examiner*—David H. Kim
*Attorney, Agent, or Firm*—Fleit, Jacobson, Cohn & Price

[57] ABSTRACT

A speaker system for radiating acoustic energy into a cabin of a motor vehicle comprises a loudspeaker unit including a vibrating member, a vibrator for vibrating the vibrating member in response to an electric signal supplied thereto and a speaker frame supporting the vibrating member and the vibrator. The speaker system further includes a speaker support supporting the loudspeaker unit, which is abutted onto a support panel of the vehicle defining the cabin. A base member is provided outside of the support panel from the cabin, toward which the speaker frame is drawn by connecting member by way of an aperture formed in the support panel so as to urge the speaker support onto the support panel.

8 Claims, 3 Drawing Sheets

SPEAKER SYSTEM FOR RADIATING ACOUSTIC ENERGY INTO A CABIN OF A MOTOR VEHICLE

BACKGROUND OF THE INVENTION

1. Field of the Invention

The present invention relates generally to speaker systems for radiating acoustic energy in to a cabin of a motor vehicle.

2. Description of the Related Art

In the speaker systems of the car stereo components, the loudspeakers or speaker systems are ordinarily mounted in various inner panel portions of the motor vehicle defining the cabin, such as the dashboard, doors, rear window shelves and so on.

As shown in FIG. 1, when a speaker system including a loudspeaker unit S and an enclosure box 12 is intended to mount at a corner of a cabin A above the rear window shelf of the motor vehicle, it is installed in the way of the following procedures. Firstly, the speaker system having an enclosure box 12 accommodating a loudspeaker unit S is put in place onto the rear window shelf located between a back portion of a rear seat 10 and a rear windshield 15. Screws 13 are usually used to secure the speaker system to the rear window shelf. The screws 13 are inserted from above the the speaker system through small bores provided in the bottom of the enclosure box 12. Sequentially, the screws 13 are screwed by means of screwdriver 14 to the rear window shelf 11 to which the speaker system is fixed.

However, in the case of a motor vehicle of such type as coupe, hardtop, fastback or the like which has a rear windshield inclining at an acute angle with respect to the rear window shelf, there is not any space between the rear wind shelf and the rear windshield sufficient for allowing a person to handle a tool for installing the speaker system such as a screwdriver.

The Applicant have therefore conceived such a speaker system as shown in FIG. 2, in which a loudspeaker having a magnetic circuit including a permanent magnet 19 and a back yoke 20. With the back yoke 20 is engaged one end of a screw rod 27, the other end of which is fixed onto the back face of the rear window shelf. However, in this case there is a possibility that the back yoke 20 is separated from the magnet 19 because the magnet 19 and the back yoke 20 are only adhered by an adhesive.

SUMMARY OF THE INVENTION

It is, accordingly, an object of the present invention to provide an improved speaker system which is readily fixed by a rigid connection into a limited space within a motor vehicle cabin, such as a rear window shelf, typically where there is minimal space adjacent the rear windshield.

In accordance with one aspect of the present invention, the speaker system for radiating acoustic energy into a cabin of a motor vehicle comprises a support panel such as a rear window shelf fixed to the motor vehicle. The support panel defines a part of the cabin and has a shelf aperture. A base-plate member is provided which is fixed to the vehicle body from outside the cabin with respect the support panel and communicates with the cabin by way of the shelf aperture. A loudspeaker unit is provided having a front face for radiating acoustic energy and a back face fastened on a speaker frame which in turn is secured to a speaker support such as an enclosure box. The speaker support includes a radiating opening confronting the front face of the loudspeaker unit and a rear opening located opposite to the radiating opening. The rear opening has a larger dimension than the shelf aperture. An edge portion of the rear opening abuts the support panel so that the rear opening confronts the shelf aperture. Finally, a connecting means is provided for connecting the speaker frame and the base member so as to draw the speaker frame toward the base member.

DETAILED DESCRIPTION OF THE EMBODIMENTS

Preferred embodiments according to the present invention are explained hereinbelow while referring to the accompanying drawings of FIGS. 3 through 5.

Figure 1:
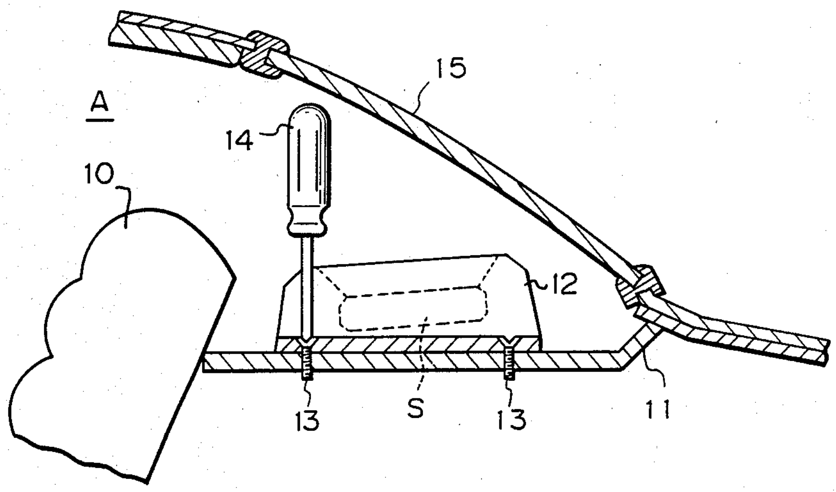
Fig. 1 (PRIOR ART)
FIG. 1 is a partial section view of a corner portion of a coupe type motor car, showing the prior installing arrangement of a speaker system and the rear window shelf.
Figure 2:
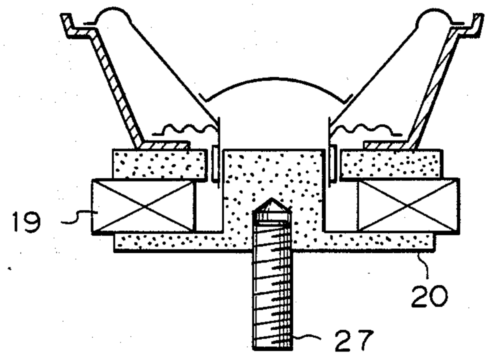
FIG. 2 is a partial section view of a speaker system which has been conceived by the Applicant.
Figure 3:
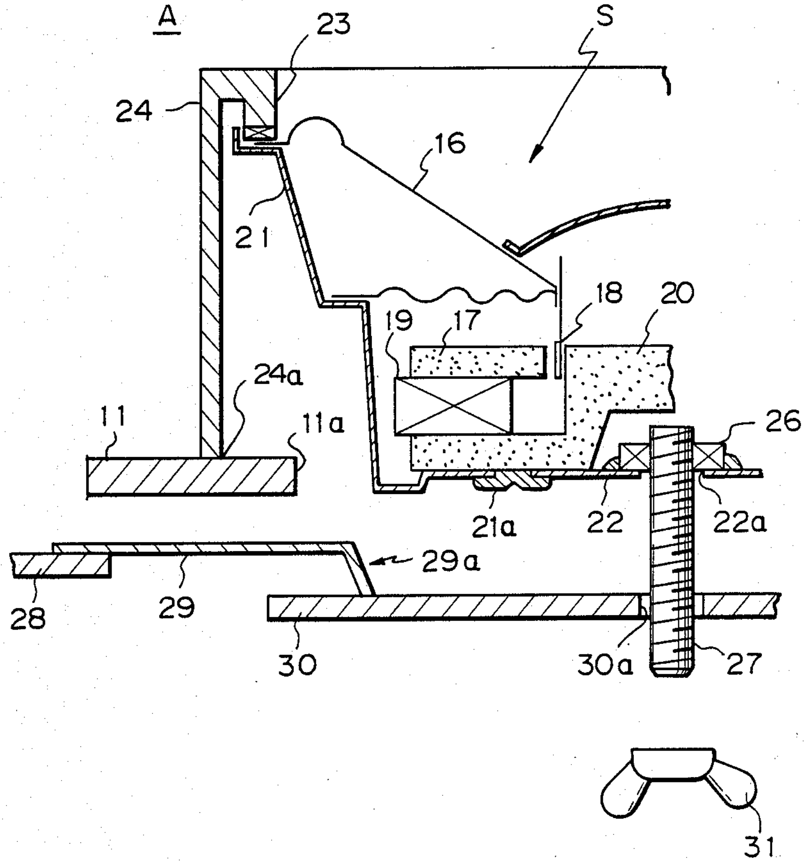
FIG. 3 is a partial section view of the speaker system in accordance with the present invention, showing that the speaker system is anchored on a rear window shelf of a motor vehicle.

Reference is now made to FIG. 3 wherein a back yoke 20 of a loudspeaker unit S is fixed to the bottom 22 of a speaker frame 21 by means of rivets 21*a*. This loudspeaker unit comprises a vibrating member 16 such as a cone, a vibrator which vibrates the vibrating member in response to electric energy supplied thereto. The speaker frame 21 supports the vibrating member 16 and the back face of the vibrator. This vibrator is constituted by a front yoke 17, the back yoke 20 and a permanent magnet 19 sandwiched therebetween. The front yoke 17 and the back yoke 20 form a magnetic gap into which a moving coil 18 is placed. In order to secure the back yoke 20 to the bottom 22 of the speaker frame 21, an adhesive agent or bolts may be used in stead of the rivets 21*a*.

An enclosure box 24 has a radiating opening 23 and a rear opening 24*a* opposite to each other. The enclosure box 24 is tightly secured to the speaker frame 21 at its peripheral portion in such a manner that the front face of the loudspeaker unit S is exposed through a radiating opening 23 in order to radiate acoustic energy of the loudspeaker unit S. The enclosure box 24 may be a rectangular tubular member partly opened at one end to form the radiating opening 23 and fully opened at the other end to form the rear opening 24*a* whose annular rear edge is spaced from the speaker frame 21 as seen from FIG. 3. The height of the enclosure box 24 may be approximately the same as that of the loudspeaker S.

The bottom 22 of the speaker frame 21 is provided with a frame center bore 22*a* on the upper edge portion of which a nut 26 is welded so as to be integrated with the bottom 22. In the back face of the back yoke 20, a recess is formed to accommodate the nut 26. A screw rod 27 is screwed into the nut 26 so as to extend backward from the loudspeaker unit S.

The rear window shelf 11 of a motor vehicle is provided with a shelf aperture 11a which is smaller than the rear opening 24*a* of the enclosure box 24. An base-plate or fixed member 29 made of for example iron which is fixed to the car body 28, is located beneath the rear window shelf 11, i.e. the outer side of the rear window shelf 11 from the cabin A. The base-plate 29 has also a base-plate aperture 29*a* which is smaller than the shelf aperture 11*a*.

When the enclosure box 24 secured to the speaker frame 21 is intended to fix to the rear window shelf 11, it is installed in the following procedures. Firstly, the enclosure box 24 including the loudspeaker unit S is put on the rear window shelf 11 in such a manner that the rear opening 24*a* of the enclosure box 24 is aligned with the shelf aperture 11*a* of the rear window shelf 11 so that the edge of the rear opening 24*a* abuts to the rear window shelf 11.

A connecting plate or anchoring plate 30 provided with a center bore 30*a* at the center and having an area larger than the base-plate aperture 29*a*, is put on the base-plate aperture 29*a* to cover it so that the screw rod 27 is inserted through the center bore 30*a*. From the top of the screw rod 27 projecting through the center bore 30*a*, a wing nut 31 is threaded on the screw rod 27 so that both of the connecting plate 30 and the bottom 22 of the speaker frame 21 are drawn each other via the screw rod 27 and the nut 31. In this way, the screw rod 27 is tightly fixed to the base-plate 29 by means of the connecting plate 30, because the connecting plate 30 is larger than the opening area of the base-plate aperture 29*a*. The shape of connecting plate 30 is not limited to a flat plate but may be a cross-shape member, or concaved plate. The connecting plate 30 has a size sufficient for hooking with a edge portion of the base-plate aperture 29*a*.

As mentioned above, the base-plate 29 is fixed to the car body 28. Therefore, the speaker frame 21 of the loudspeaker unit S is tightly securêd to the car body 28 so that the edge portion of the rear opening 24*a* of the enclosure box 24 is firmly urged to the rear window shelf 11.

When the enclosure box 24 has a relatively smaller height than that of the loudspeaker unit S, a connecting plate of an U-shaped type is used as a connecting member.

Figure 4:
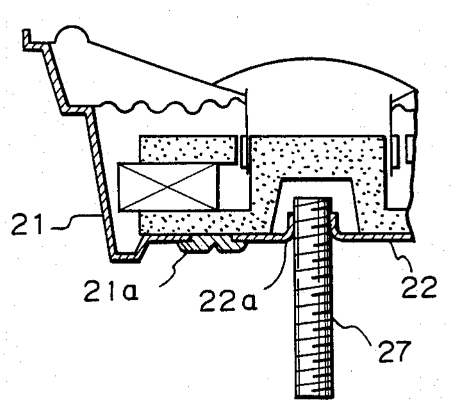
FIG. 4 is a partial section view of another speaker system in accordance with the present invention, showing that a loudspeaker unit is provide with a threaded bore in the speaker frame in stead of a nut welded thereon.

FIG. 4 shows another embodiment according to the present invention in which a threaded portion is formed in the inner face of the frame center bore 22*a* in stead of the nut 26 so that the screw rod 27 is secured thereinto.

Figure 5:
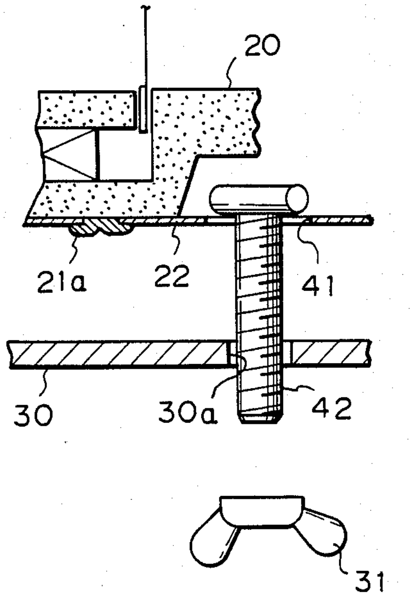
FIG. 5 is a partial section view of a further speaker system in accordance with the present invention, showing that the speaker frame has a slot through which a T-shaped head of a screw rod is hooked.

FIG. 5 shows a further speaker system in accordance with the present invention, in which a slot 41 is formed in the bottom 22 of the speaker frame 21. A T-shaped screw rod 42 is inserted and twisted through the slot 41 so that the T-shaped head of the rod 42 is hooked with the bottom 22. Sequentially, the rod 42 is screwed by a wing nut 31 so as to be engaged with the connecting plate 30.

These embodiments are preferably adopted to light weight speaker systems which enable to simplify the coupling the speaker frame 21 and the screw rod 27. In addition, these embodiments reduce adverse influences of the loudspeaker unit in which the speaker elements such as the magnet and the front and back yokes separate each other between adhered surfaces thereof due to vibrations of the motor vehicle.

As described above, the speaker system according to the present invention does not make it necessary to fasten the enclosure box by using a plurality of screws to be screwed from above the enclosure box. Therefore, it enables to readily fix the speaker system to the corner portion of the vehicle cabin such as a rear window shelf on which there is not any sufficient room adjacent to the rear windshield. Furthermore, the present invention increases the rigid connection between the speaker system and an interior panel of the motor vehicle such as a rear window shelf.

What is claimed is:

1. A speaker system for radiating acoustic energy into a cabin of a motor vehicle comprising:

a support panel fixed to said motor vehicle and defining a part of said cabin and having a shelf aperture;

a fixing member placed outside said cabin with respect to said support panel and communicating with said cabin by way of said shelf aperture;

a loudspeaker unit having a speaker frame having a front face portion;

a vibrating member supported by said speaker frame and confronting the front face portion of said speaker frame;

a vibrator mounted by said speaker frame for sitting below said vibrating member and driving said vibrating member;

a tubular speaker support secured to the front face portion of said speaker frame and comprising a front end including a radiating opening confronting said vibrating member, and a rear end having a rear opening located opposite said radiating opening, said rear end being spaced from said speaker frame and said rear opening being of a larger dimension than said shelf aperture, and said rear end abutting said support panel so that said rear opening confronts said shelf aperture; and connecting means for connecting said speaker frame and said fixing member so as to draw said speaker frame toward said fixing member but maintaining said speaker frame spaced apart from said support panel.

2. A speaker system as set forth in claim 1, wherein said fixing member is fixed to said motor vehicle and includes a wide aperture having an edge portion, said connecting means includes a connecting plate abutting the edge portion of said wide aperture of said fixed member from the outside of said cabin, said connecting plate having a center bore, a screw rod engaging at one end thereof with said speaker frame and projecting through said wide aperture and said center bore at the other end thereof, and a nut threaded to said screw rod at the outside of said cabin.

3. A speaker system as set forth in claim 2, wherein said speaker frame has a nut welded to said speaker frame so that said screw rod is screwed into said welded nut and fixed to said speaker frame.

4. A speaker system as set forth in claim 3, wherein said support panel is a rear window shelf adjacent to a rear windshield of said motor vehicle.

5. A speaker system as set forth in claim 2, wherein said speaker frame has a threaded bore so that said screw rod is screwed into the threaded bore and fixed to said speaker frame.

6. A speaker system as set forth in claim 5, wherein said support panel is a rear window shelf adjacent a rear windshield of said motor vehicle.

7. A speaker system as set forth in claim 2, wherein said speaker frame has a slot and said screw rod has a T-shaped head, said screw rod being insertable through said slot so that rotation of said screw rod hooks said screw rod to the speaker frame.

8. A speaker system as set forth in claim 7, wherein said support panel is a rear window shelf adjacent a rear windshield of said motor vehicle.

* * * * *